United States Patent [19]
Mangelsdorf

[11] Patent Number: 5,465,132
[45] Date of Patent: Nov. 7, 1995

[54] FINDER SYSTEM FOR A REFLEX CAMERA

[75] Inventor: Jürgen Mangelsdorf, Cremlingen, Germany

[73] Assignee: Rollei Fototechnic GmbH & Co., Braunschweig, Germany

[21] Appl. No.: 68,719

[22] Filed: May 27, 1993

[30] Foreign Application Priority Data

Sep. 14, 1992 [DE] Germany .......................... 9212286 U

[51] Int. Cl.$^6$ ................................................. G03B 13/02
[52] U.S. Cl. ........................................ 354/219; 354/223
[58] Field of Search ................................... 354/219, 223, 354/224, 222

[56] References Cited

U.S. PATENT DOCUMENTS

| | | | |
|---|---|---|---|
| 3,590,683 | 7/1971 | Hiruma | 354/223 |
| 3,651,735 | 3/1972 | Hiruma | 354/223 |
| 3,788,202 | 1/1974 | Wiessner | 354/223 |
| 3,815,149 | 6/1974 | Ishihara | 354/223 |
| 3,913,116 | 10/1975 | Kastner et al. | 354/223 |
| 4,131,354 | 12/1978 | Haginara | 354/224 |
| 4,279,489 | 7/1981 | Shono | 354/155 |
| 4,381,892 | 5/1983 | Someya | 354/287 |
| 4,804,983 | 2/1989 | Thayer, Jr. | 354/76 |
| 4,918,475 | 4/1990 | Edwards | 354/76 |
| 5,053,794 | 10/1991 | Benz | 354/79 |
| 5,099,265 | 3/1992 | Lee | 354/219 |
| 5,712,897 | 12/1987 | Crema | 354/219 |

FOREIGN PATENT DOCUMENTS 61-169825  7/1986  Japan .

*Primary Examiner*—Russell E. Adams
*Assistant Examiner*—Nicholas J. Tuccillo
*Attorney, Agent, or Firm*—Cohen, Pontani, Lieberman, Pavane; Christa Hildebrand

[57] ABSTRACT

A finder system for a reflex camera is disclosed with a finder in the form of a hood with an eyepiece at the top that can be looked straight down through. The hood has an opening in one wall of the hood, an attachment that accepts either a 90° telescopic finder or a video finder which rests against the opening, the optical axis of the telescopic or video finder is perpendicular to that of the straight-down finder, a mirror is positioned in the hood at the intersection of the optical axes and at an angle of 45° thereto, and the mirror deflects the light 90° parallel with the optical axis of the telescopic or video finder.

11 Claims, 4 Drawing Sheets

FINDER SYSTEM FOR A REFLEX CAMERA

BACKGROUND OF THE INVENTION

The present invention concerns a finder system for a reflex camera with a finder in the form of a hood with an eyepiece at the top that can be looked straight down through.

Straight-down finders, 90° prismatic finders, and video finders are known. Only one such finder at a time can be employed on a reflex camera.

SUMMARY OF THE INVENTION

The object of the present invention is to simplify the handling of various types of finder.

This object is attained in accordance with the invention in that there is an opening in one wall of the hood, an attachment that accepts either a 90° telescopic finder or a video finder rests against the opening, the optical axis of the telescopic or video finder is perpendicular to that of the straight-down finder, a mirror is positioned in the hood at the intersection of the optical axes and at an angle of 45° thereto, and the mirror deflects the light 90° parallel with the optical axis of the telescopic or video finder.

The finder system in accordance with the invention is accordingly multifunctional. It can be used with either single-lens or twin-lens reflex cameras. It is modular. It allows the straight-down finder to be used along with either a 90° telescopic finder or a video finder. Its basic structure is a hood with an eyepiece at the top and with an integrated 90° deflection mirror. The mirror can be either a full-silvered folding mirror or a stationary semitransparent mirror.

For tight places it is of advantage for the finder system to rotate about the optical axis of the hood on the same level as the ground glass.

The telescopic or video finder is preferably accommodated in an attachment. The crosssection of the attachment precisely parallels the optical axis of the straight-down finder. The attachment can have a bracket. The video finder or telescopic finder can rest on the bracket and be temporarily secured to it by a fastener.

The video finder is a video camera with an object lens. One practical method of attaching it is with a longitudinally angular adapter. The shorter section of the adapter can be temporarily secured to the bracket by a knurled knob, and its longer section accommodates the camera. The camera rotates about the optical axis of the telescopic finder in the adapter to maintain a right-side up image on its monitor. Further characteristics of the invention are recited in the dependent claims.

BRIEF DESCRIPTION OF THE DRAWINGS

Two embodiments of the invention will now be specified by way of example with reference to the drawing, wherein.

DETAILED DESCRIPTION

Figure 1:
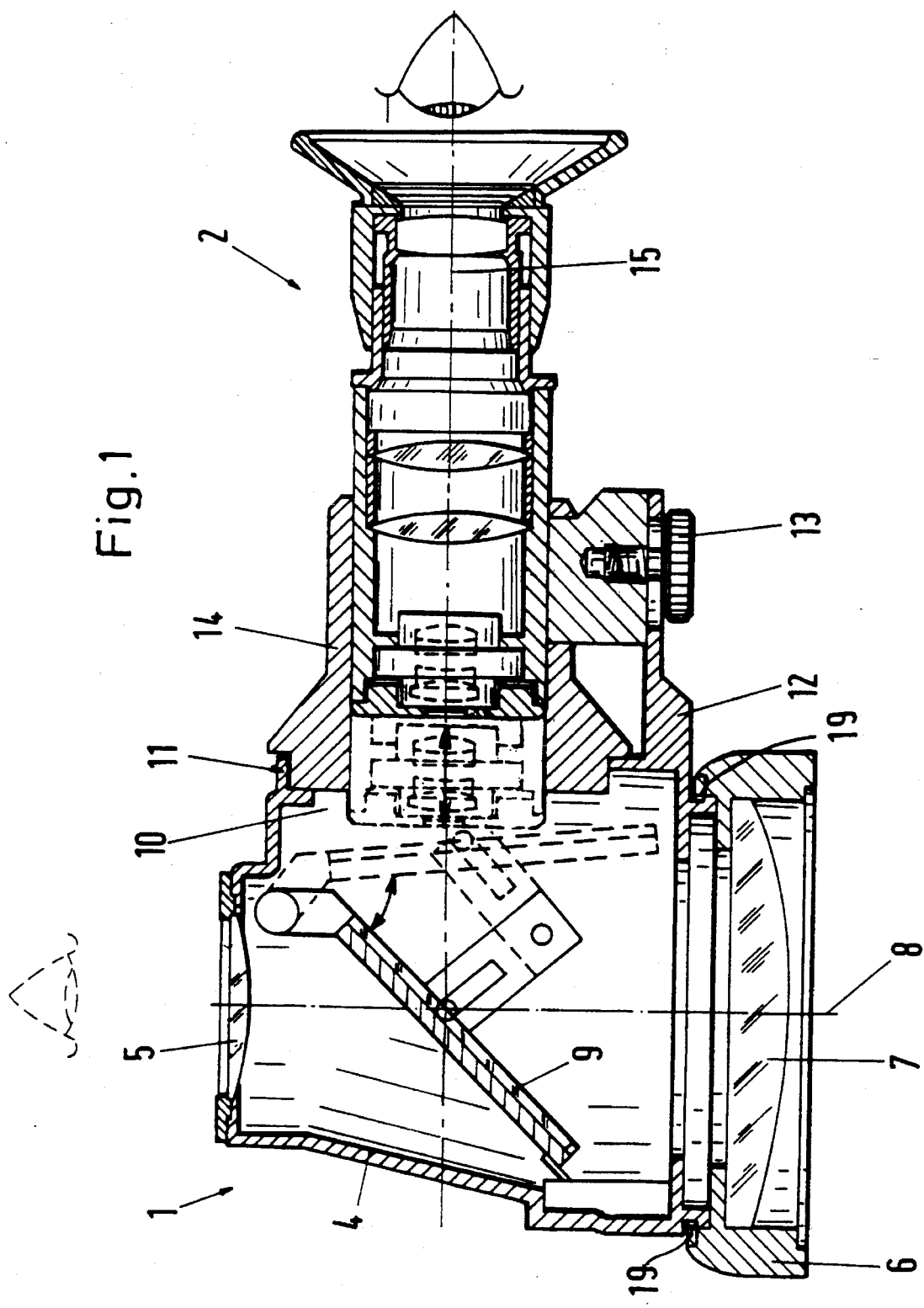
FIG. 1 illustrates a finder system comprising a straight-down finder with a telescopic finder attached to it and FIG. 2 illustrates a finder system comprising a straight-down finder with a video finder attached to it.

The finder system illustrated in FIG. 1 is intended for mounting on a single-lens or twin-lens reflex camera, preferably in the medium format. It consists of a straight-down finder 1 that either a telescopic finder 2 (FIG. 1) or a video finder 3 (FIG. 2) can be attached to.

Straight-down finder 1 comprises a hood 4 with an eyepiece 5 at the top that can be looked straight down through. The bottom of hood 4 can be secured to the housing 6 of an otherwise unillustrated reflex camera. It can rotate 360° around the camera to one of four different positions defined by slots 19 distributed at angles of 90°. This feature allows the mount to be rotated to a convenient position when photographs are being taken in a limited space. The illustrated embodiment accommodates a field lens 7 in the optical axis 8 of straight-down finder 1 or eyepiece 5.

Accommodated in hood 4 is a folding mirror 9. When mirror 9 is in the position represented by the continuous lines, it is at an angle of 45° to the optical axis 8 of straight-down finder 1. It can be folded down out of that position and into the position represented by the broken lines, as indicated by an arrow in FIGS. 1 and 2.

In one wall of hood 4 is an opening 10. Resting against opening 10 is an attachment 11. The cross-section of attachment 11 precisely parallels the optical axis 8 of straight-down finder 1. Fastened to attachment 11 is a bracket 12. Either a telescopic finder 2 or a video finder 3 rests on bracket 12 and can be temporarily secured to it by a knurled knob 13.

The telescopic finder 2 illustrated in FIG. 1 fits into a sleeve 14. Sleeve 14 rests on bracket 12, to which it can be temporarily secured by knurled knob 13. Telescopic finder 2 has dioptric compensation for visual defects. It also has a zoom lens for adjusting scope that slides back and forth along its optical axis 15 in sleeve 14, as indicated by an arrow in FIG. 1. The length of telescopic finder 2 can also be adjusted to accommodate film-stock magazines of different size.

When telescopic finder 2 is being employed, mirror 9 is at the intersection between the optical axis 15 of telescopic finder 2 and the optical axis 8 of straight-down finder 1 and deflects light along optical axis 15. Mirror 9 is full-silvered and folds down from between field lens 7 and eyepiece 5 when straight-down finder 1 is employed. It is also possible for the mirror to be semitransparent and positioned stationary in the position inside hood 4 represented by the continuous lines.

Figure 2:
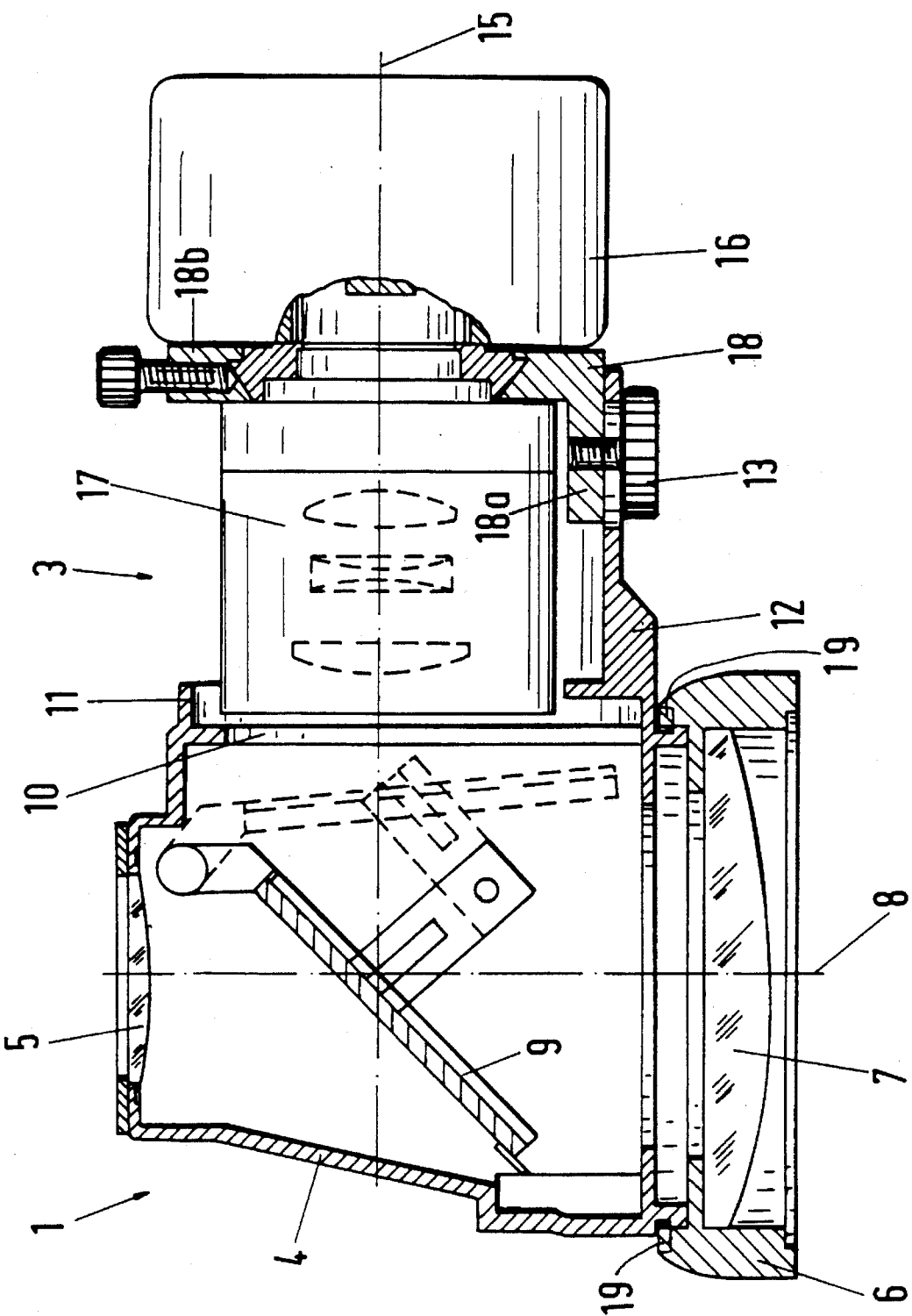

The video finder 3 illustrated in FIG. 2 comprises a video camera 16 with its own lens system 17. Video finder 3 is secured with an adapter 18. Adapter 18 bends up longitudinally. Its shorter section 18a can be temporarily secured to bracket 12 by knurled knob 13 and its longer section 18b accommodates video camera 16. The video camera rotates about the optical axis 15 of video finder 3 in adapter 18 to maintain a right-side up image.

Figure 3:
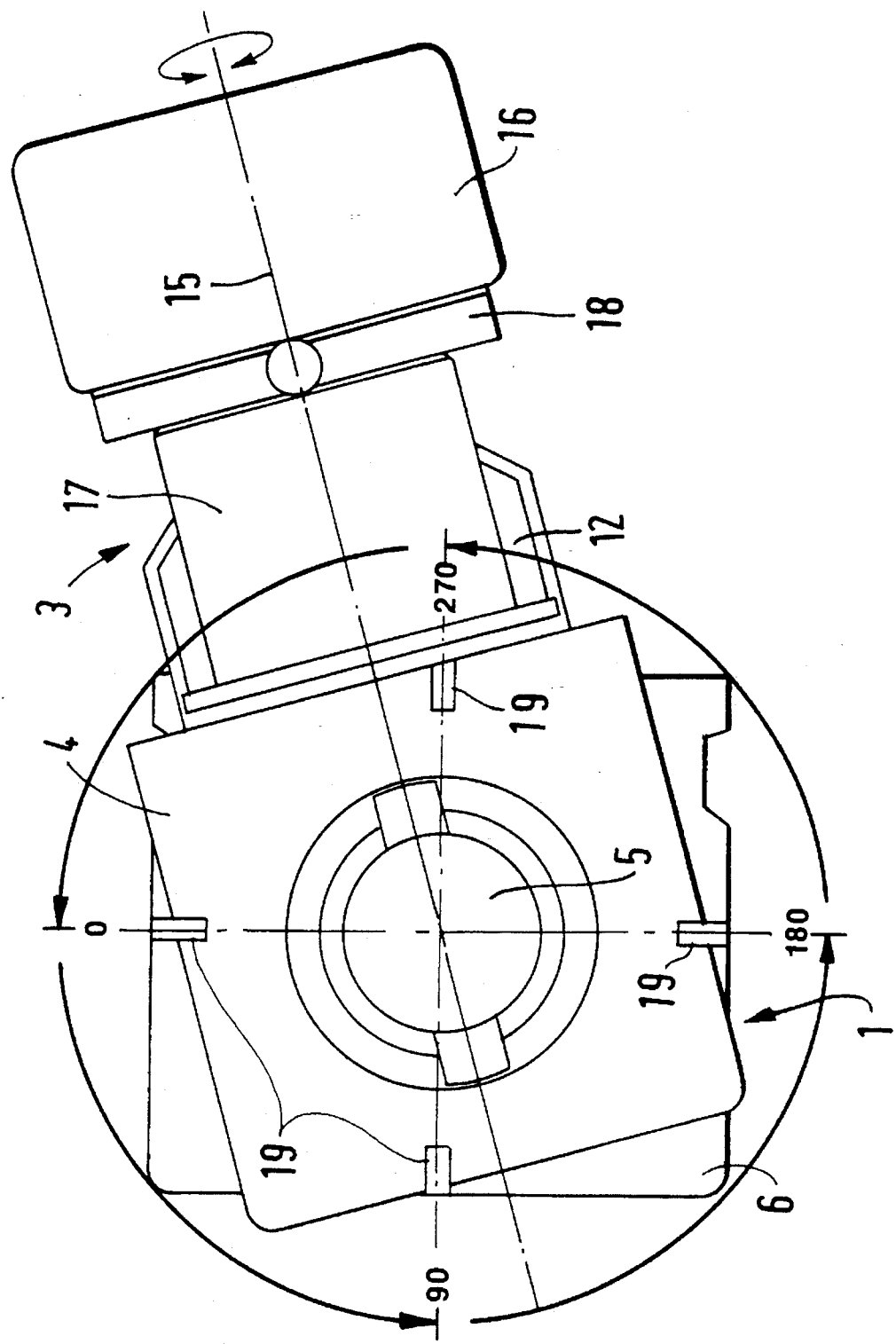
FIG. 3 illustrates a top view of the finder system of FIG. 2.

The top view of video finder 3 is shown in FIG. 3. The rotational ability of the hood 4 relative to the camera housing 6 is indicated by the arrow. The four different positions are defined by four slots 19 which are distributed at angles of 90°. The arrow shown in the video camera 16 indicates the rotation about the optical axis 15 of the video finder 3.

Figure 4:
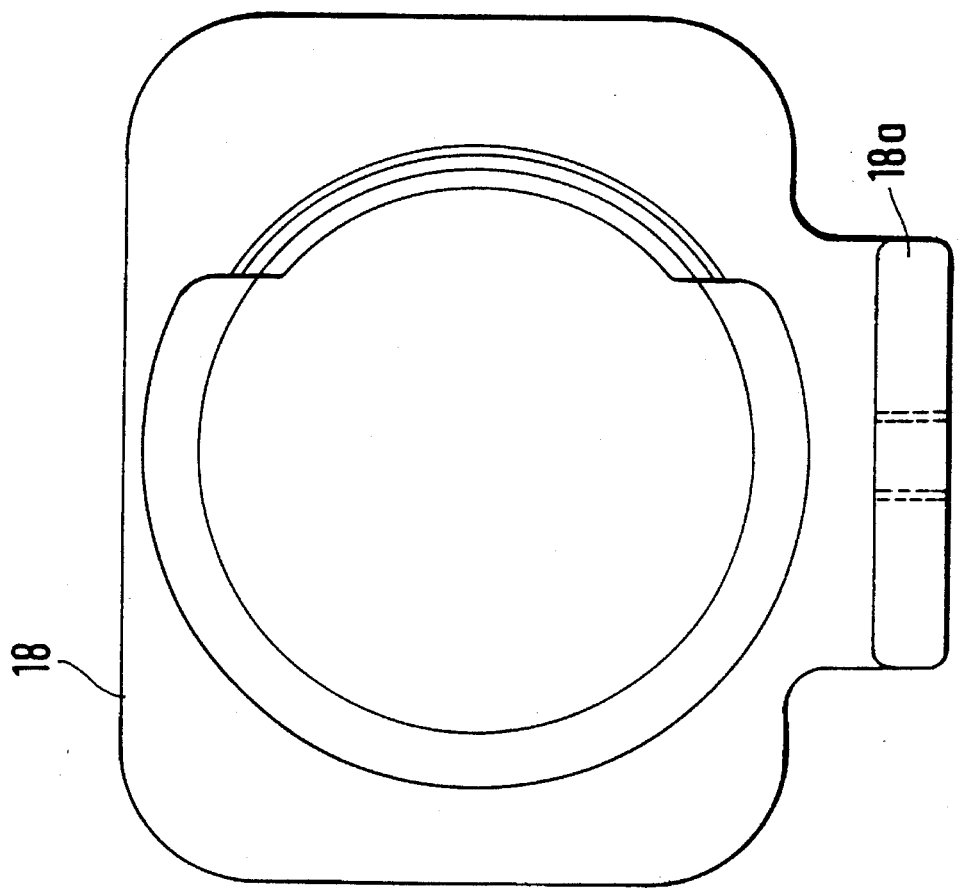
FIG. 4 illustrates the rear view of the adapter shown in FIG. 2.
Figure 5:
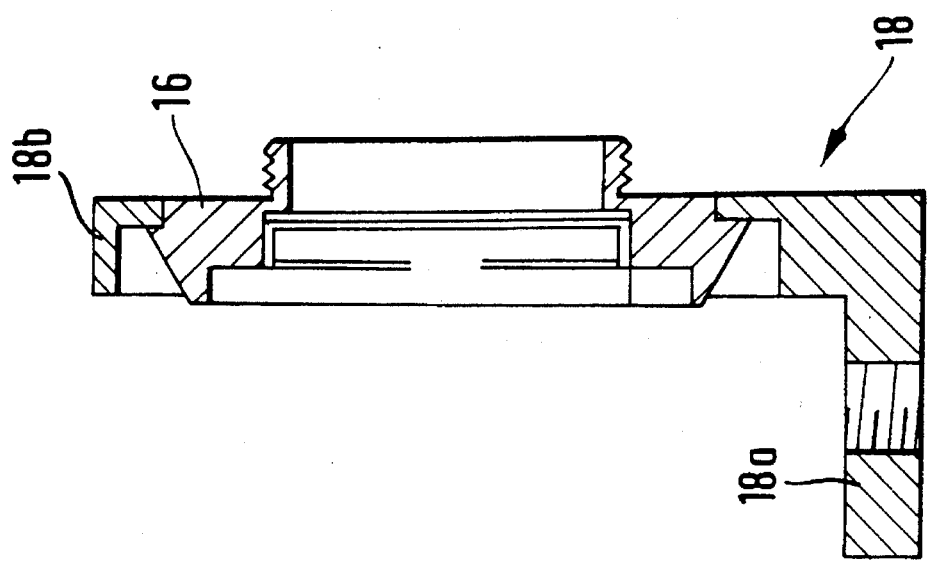
FIG. 5 illustrates a longitudinal section through the adapter shown in FIG. 4.

FIG. 4 shows the rear view of the adapter 18 of the finder system of FIG. 2. FIG. 5 illustrates on a larger scale the longitudinal section through the adapter 18 of FIG. 4 and is in accordance with the longitudinal section of FIG. 2 showing adapter 18. In FIG. 5, as well as in FIG. 2, the rear end of the video camera 16 is shown rotatably fixed in longer section 18 b of adapter 18.

I claim:

1. A finder system for a reflex camera with a finder in the form of a hood with an eyepiece at the top that can be looked straight down through, comprising a hood having an opening in one wall of the hood, an attachment that accepts interchangeably either a 90° telescopic finder or a video finder which rests against the opening, the optical axis of the telescopic or video finder being perpendicular to the axis of the straight-down finder, a mirror being positioned in the hood at the intersection of the optical axis of the straight-down finder and the axis of the telescopic finder or the video finder and at an angle of 45° to either axes, and the mirror deflecting the light 90° parallel with the optical axis of the telescopic or video finder and further comprising means for rotating the finder system about 360° in the camera to one of four different positions defined by slots distributed at angles of 90°.

2. The finder system of claim 1, wherein the mirror is a folding mirror that pivots out of the optical axis of the straight-down finder.

3. The finder system of claim 1, wherein the mirror is semitransparent and positioned stationary in the hood.

4. The finder of claim 1, wherein the finder system rotates about the optical axis of the straight-down finder on the same level as the ground glass.

5. The finder system of claim 1, wherein the telescopic finder has a zoom lens for adjusting scope that slides back and forth along its optical axis in a sleeve.

6. The finder system of claim 1, wherein the length of telescopic finder can be adjusted.

7. The finder system of claim 1, wherein the attachment has a cross-section precisely parallel to the optical axis of the straight-down finder.

8. The finder system of claim 7, wherein the attachment has a bracket and the video finder or telescopic finder rests on the bracket and can be temporarily secured to it by a fastener.

9. The finder system of claim 8, wherein the fastener is a knurled knob.

10. The finder system of claim 8, further comprising an adapter having in its longitudinal cross-section an approximately angular form having a shorter section and a longer section and means for securing the shorter section temporarily to the bracket and means for accommodating in the longer section the video camera.

11. The finder system of claim 10, further comprising means for rotating the video camera about the optical axis of the telescopic finder in the adapter.

* * * * *